April 20, 1937. DE WAYNE TOWNSEND ET AL 2,077,500
APPARATUS FOR THE IDENTIFICATION OF X-RAY FILMS
Original Filed Sept. 20, 1932  2 Sheets-Sheet 1
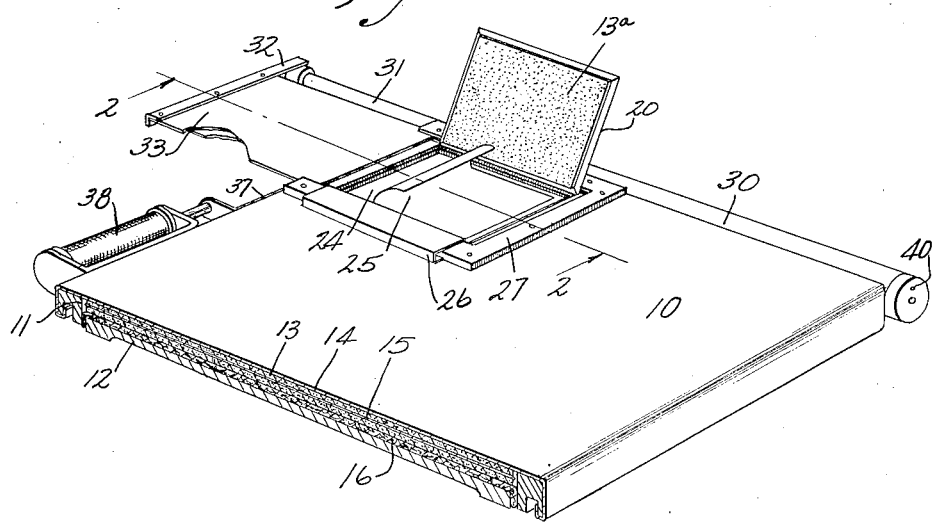
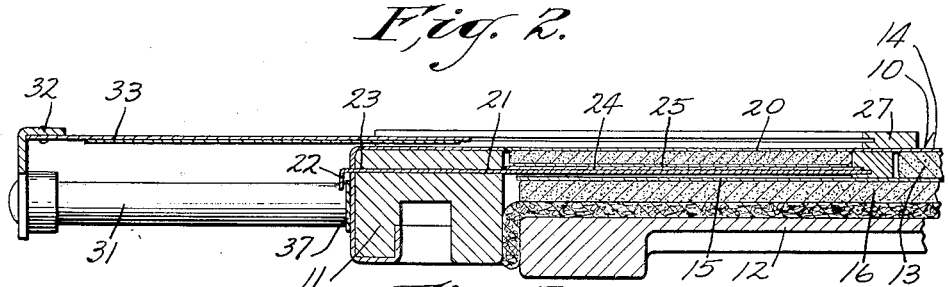
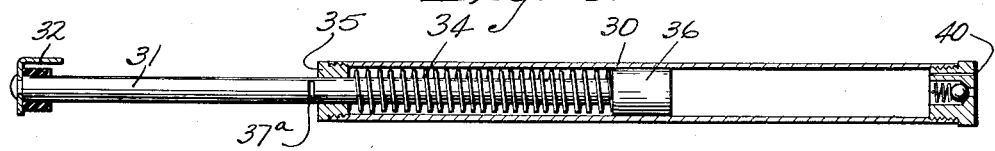
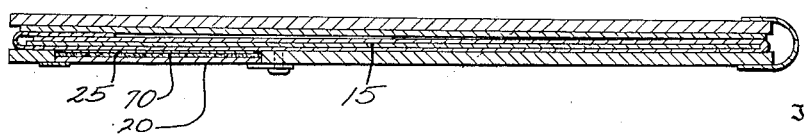

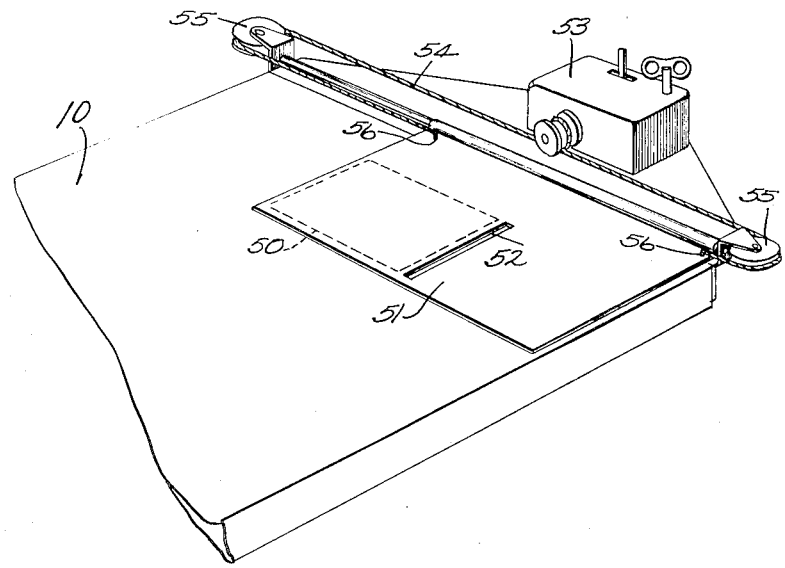
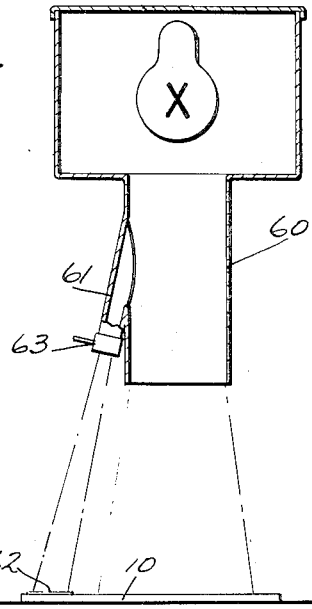

Patented Apr. 20, 1937

2,077,500

UNITED STATES PATENT OFFICE 2,077,500

APPARATUS FOR THE IDENTIFICATION OF X-RAY FILMS

De Wayne Townsend, Brooten, Minn., and George W. Bradburn, Milwaukee, Wis.

Original application September 20, 1932, Serial No. 633,950. Divided and this application March 14, 1935, Serial No. 11,120

2 Claims. (Cl. 250—34)

Our invention relates to improvements in apparatus for the identification of X-ray films.

This is a division of our application, Serial No. 633,950, filed September 20, 1932, for identification of X-ray films.

Heretofore the only means of identifying a particular exposed X-ray film with a particular individual whose anatomy has been X-rayed has been the placing of lead numbers and characters upon a casette or exposure holder during the exposure of the film to the X-ray, and the resulting identification numbers and characters upon the exposed and developed film have been dependent upon accuracy and integrity of clerical work subsequent to the exposure.

It is the object of our invention to provide means for identifying positively a given exposed and developed film with a particular patient and the particular technician and Roentgenologist, by providing means whereby the signatures of the respective persons may appear upon the film in conjunction with any other data necessary to the identification of the particular subject exposed.

Our invention consists of an improved X-ray casette or exposure holder whereby a label, printed, typewritten and/or written, may be placed in intimate contact with a film in the casette without the use of a dark room, and properly exposed to the X-ray for the production of the best and clearest results in the developed film.

In the drawings:

Figure 1 is an isometric view of one end of an X-ray film casette embodying our invention.

Figure 2 is a section on line 2—2 of Figure 1.

Figure 3 is a vertical section through a portion of a special shutter for a film casette embodying our invention.

Figure 4 is an isometric view of an alternative shutter arrangement.

Figure 5 is a vertical section through a special "cone" for use in conjunction with our improved casette.

Figure 6 is a vertical section through an ordinary exposure holder incorporating our invention.

Like parts are identified by the same reference characters throughout the several views.

In carrying out our invention, we have resorted to the structure shown in the accompanying drawings, in which the casette is indicated generally at 10, and the parts found therein include the marginally flanged receptor 11, and a cover 12, constituting the bottom or under side of the casette, usually made of aluminum or other X-ray transparent material. The receptor provides space above the cover 12 for a pack including an upper fluorescent screen 13 associated with the broad flat top 14 of the casette 10, the X-ray film 15, and the lower fluorescent screen 16 associated directly with the cover or closure member 12.

We have found that any label bearing an identifying inscription to be effective upon the film, must be exposed to the X-ray while such label is in intimate association with the film, and while it is in such relation to the fluorescent screen, that the intensity of the X-rays may be emphasized by such screen upon the label as well as upon the film. We have, therefore, provided a casette, as shown in the drawings, which includes a special label receptor which, as shown most clearly in Figures 1 and 2, includes a window 20 of suitable size and shape and so disposed in a corner or along one margin of the casette as to include areas of the film least likely to be necessary to the exposure of parts of the anatomy to be pictured by the X-ray.

The window 20, in the form in which we have incorporated our invention in the particular casette shown in Figures 1 and 2, comprises a part of the top 14 of the casette and the corresponding part of the fluorescent screen 13 is secured to the window 20, as indicated in Figure 1.

Since it is our purpose to provide a structure which will permit of the insertion of a label carrying an identifying inscription without resort to a dark room, we provide a light shield 21 with a finger tab 22 receivable into the casette through a slot 23 much as the ordinary light screen is receivable into a film pack used in an ordinary camera. This light screen then is guided between the film 15 and the area to be exposed by the window 20 by a thin transparent envelope or layer 24 which protects the fluorescent screen and the label from abrasion.

The light shield 21 may be of any suitable material such as a thin sheet of copper, which will exclude light from the film 15 while the window 20 is open. This enables the use of our improved casette to open the window 20 and place upon the transparent protective envelope or layer 24 a label 25 bearing a suitable identifying inscription which preferably will state the name of the patient, the date, and the signatures of the patient, the Roentgenologist and the technician present when the X-ray exposure is made, together with data describing and locating the particular portion of the anatomy to be pictured upon the X-ray film, and other pertinent facts regarding the case.

When the label 25 is in place, the window 20 may be closed and locked in place by means of a clip 26 forming a movable part of a frame 27 surrounding the opening into which the window 20 fits in light proof engagement.

However efficient our relatively X-ray proof ink may be, we have found that it is not advisable to expose an identifying label to the X-ray for more than a comparatively short time, and preferably exposure should not be more than one-half of a second. We have, therefore, provided in conjunction with our improved casette, a special shutter which will now be described.

Along one side of the casette 10 we provide a plunger casing or cylinder 30 within which a piston 31 may reciprocate. At one end of the piston 31 we provide a bracket 32 which in turn carries shutter 33 which is held rigidly by the bracket, but is also guided by grooves in the sides of the frame 27 around the opening for window 20. A spring 34 housed within the cylinder 30 bears against a cap 35 at one end of the cylinder, and against a plunger 36 formed at one end of the piston 31. Normally, therefore, the shutter 33 will be urged to a closed position over the window opening, but we provide at 37 a catch for engagement with a detent 37a in the plunger 31 to hold the shutter 33 in open position as indicated in Figure 1, and we have provided a solenoid at 38 to disengage the catch 37 from the detent 37a at the time that the X-ray film is to be exposed to X-rays. For this purpose we have electrically connected the solenoid 38 for energization simultaneously with the energization of the X-ray tube, thus insuring that the shutter 33 will close under the urge of spring 34 within a comparatively short time after the X-ray exposure is commenced.

The speed with which the shutter will close will be dependent upon the release of air through a bleed hole 40 at the end of cylinder 30, or by other controlling devices.

In operation our invention is used as follows. Assuming that a film has been properly installed in the casette 10 in a dark room, and that light shield 22 is in place below the transparent envelope or layer as indicated in Fig. 2, that label 25 printed with an X-ray opaque writing ink, or typewriter ribbon, may be placed upon the celluloid envelope and the window 20 closed down tightly upon the label with the fluorescent screen 13a directly in association with the identifying label. The clip 26 may then be moved to hold the window tightly closed against infiltration of sunlight.

The light shield 22 may then be withdrawn from the casette, thus permitting the identifying label to come into intimate association with the film except for the thin abrasion protective transparent envelope or layer interposed therebetween.

Throughout the manipulation of the casette up to this point the X-ray opaque shutter 33 is in extended position as indicated in Figure 1, and the catch 37 is in engagement with the detent 37a in plunger 31. The entire casette with its identifying label is now ready for X-ray exposure and, with the subject to be exposed superimposed upon the casette, the switch for control of the X-ray tube may be closed.

Immediately upon the closure of this switch the solenoid 38 is energized and the plunger 31 is released by the catch 37. The shutter 33 will immediately close with a speed dictated by the release of air from the cylinder 30 at the bleed hole 40 or other controlling device. Thereafter the time of exposure of the portion of the film not covered by the X-ray opaque shutter 33 may be controlled by the Roentgenologist without regard for the result to be obtained by the use of the identifying label, since the X-ray opaque shutter 33, automatically timed to give the proper exposure for the label, has taken care of the requirement for X-ray exposure in the area covered by the window 20.

Under some circumstances the shock incident to the action of the solenoid 38 or the spring 34 may be detrimental to the clarity of the X-ray film because of motion and we have provided two forms of alternative construction for use in conjunction with our invention as shown in Figures 4 and 5.

In Figure 4 the casette 10 is provided with a window at 50 under which the identifying label may be placed, and in place of the usual shutter 33 we provide an X-ray opaque shutter 51 which is in a slidable relation to the casette 10 and which is provided with a slot 52.

The shutter 51 is slidably moved across the casette by means of a clockwork or other device 53 which operates a cable 54 looped around pulleys 55 at either edge of the casette and secured to the shutter at 56. A smooth working operation of a clockwork mechanism or other device 53 will produce virtually no vibration or shock, and will cause the shutter 51 with its slot 52 to expose the identifying label in the window 50 in accord with any timing arrangement which may be provided in the clockwork or other mechanism 53.

In Figure 5 provision has been made in a special cone 60 for the projection through an auxiliary cone 61 of X-rays specially directed at the window 62 in casette 10. A special shutter 63 in the auxiliary cone 61 will shut off the X-ray from the area included in window 62 without vibration or shock to the casette 10.

In Figure 6 an ordinary exposure holder is shown, with window, light proof slide, and X-ray opaque timer controlled shutter; a small screen corresponding to the size and shape of the screen in the window is shown at 70.

We ascribe our success in placing identifying data and signatures upon exposed X-ray film; the placing of an identifying label in intimate association with an X-ray film during exposure of the film; the placing of identifying label in the casette or exposure holders in such relation to the fluorescent screen as to produce an effective mark upon the exposed film even though the ink is only relatively X-ray opaque; and the provision for comparatively short time exposure of our label to the X-ray even though the subject to be pictured may require a much longer time exposure than we have found efficacious for exposure of our identifying label. The effect, therefore, of our invention is to provide something which has not been heretofore possible under the usual process or with use of the usual equipment in which all of the film has been exposed to a like intensity of exposure of the X-ray and where lead letters and characters on the outside of casettes or exposure holders have been used.

We claim:

1. The combination with an X-ray casette including a fluorescent screen, a window in the casette including a corresponding portion of the fluorescent screen, a label bearing an X-ray opaque inscription for insertion upon the film under the window and corresponding portion of the fluorescent screen, a light screen for temporary insertion in the casette to prevent access of light to the film when the window is open and means for exposing the label to X-rays for a different time interval than that allowed for the remainder of the film.

2. The combination with an X-ray casette having a slotted wall and including a fluorescent screen, a window in one surface of the casette including a movable portion of the fluorescent screen and a light-screen receivable through the slot in light-protective relation to the area exposed in the opening of the window.

DE WAYNE TOWNSEND.
GEORGE W. BRADBURN.